United States Patent [19]
Tanaka

[11] 4,271,551
[45] Jun. 9, 1981

[54] BINDING DEVICE FOR HOSES FLOATING ON WATER SURFACE

[75] Inventor: Mamoru Tanaka, Yokohama, Japan

[73] Assignee: Bridgestone Tire Co., Ltd., Tokyo, Japan

[21] Appl. No.: 7,537

[22] Filed: Jan. 29, 1979

[30] Foreign Application Priority Data

Feb. 1, 1978 [JP] Japan ............................. 53-10060[U]

[51] Int. Cl.³ ...................... B63B 21/52; F16L 55/00
[52] U.S. Cl. .......................................... 9/8 R; 9/400;
138/103; 267/141; 267/153
[58] Field of Search .................... 9/8 R, 8 P, 311, 340, 9/329, 400; 405/171, 166; 285/137 R, 137 A; 248/68 R, 68 CB, 69; 114/219, 220; 267/141, 153; 138/103, 106, 110

[56] References Cited

U.S. PATENT DOCUMENTS

| | | | |
|---|---|---|---|
| 2,404,594 | 7/1946 | Pfleumer | 9/8 R |
| 3,292,566 | 12/1966 | Russell | 114/219 |
| 3,811,142 | 5/1974 | Westra | 9/8 P |
| 3,892,398 | 7/1975 | Marsh | 267/153 |

FOREIGN PATENT DOCUMENTS

1177908 1/1970 United Kingdom ....................... 9/8 P

*Primary Examiner*—Sherman D. Basinger
*Attorney, Agent, or Firm*—Sughrue, Rothwell, Mion, Zinn and Macpeak

[57] ABSTRACT

A binding device for hoses floating on the water surface, particularly, for a plurality of hoses arranged in parallel and floating on the water surface and connecting adjacent two hose lines by chains, comprising a resilient cylindrical cushioning body having a center bore surrounding the chain and including a buoyant member and reinforcing element embedded therein.

6 Claims, 4 Drawing Figures

FIG_2
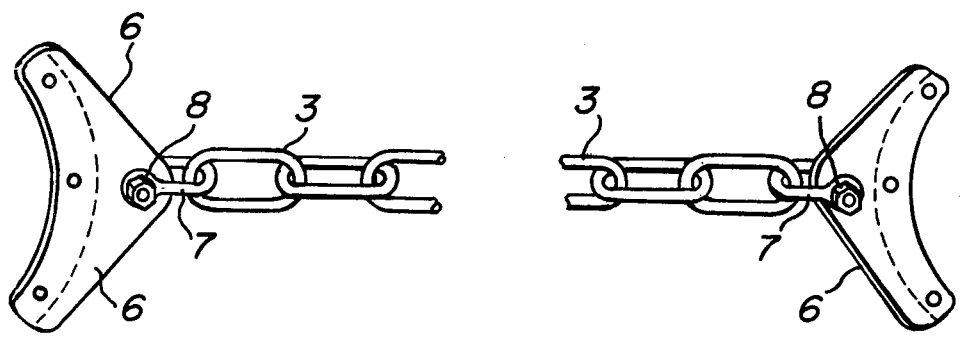
FIG_3
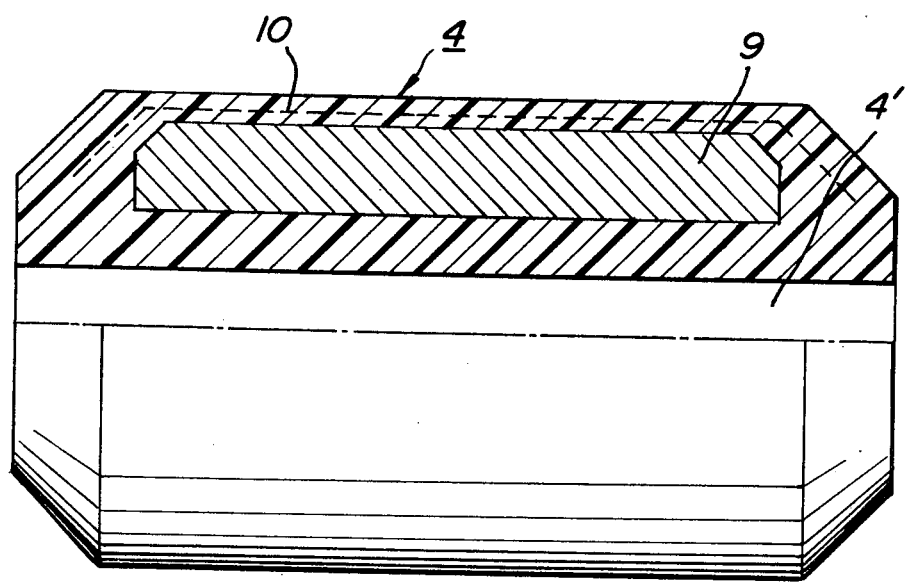

BINDING DEVICE FOR HOSES FLOATING ON WATER SURFACE

BACKGROUND OF THE INVENTION

1. Field of the Invention

This invention relates to a binding device for hoses floating on water surface and particularly, for a plurality of hoses arranged in parallel and floating on the water surface and connecting adjacent two hose lines by chains to prevent these hose lines from collision with each other or separating from each other.

2. Description of the Prior Art

Hoses floating on the water surface have been used, for example, for transporting crude oil from an oil tanker on the sea to an oil reservoir installation on the land. In general, in the case of discharging the crude oil from the oil tanker, the oil tanker is not directly moored. In order to shorten the mooring time of the oil tanker, a plurality of hoses are delivered from the oil tanker and arranged and float in parallel on the sea surface. Those hose lines are connected to a mooring buoy on the sea. In this case, the hose lines each composed of the floating hoses tend to be easily subjected to the influence of waves or the like and separated one from the other. In order to prevent such drawback, the adjacent two hose lines are connected with each other by means of chains or the like.

The use of such chains or the like can prevent the adjacent two hose lines from separating from one another, but provides the drawback that the chain sags to cause the adjacent hose floating on the sea to approach and collide with each other and eventually break.

SUMMARY OF THE INVENTION

An object of the invention, therefore, is to provide a binding device for a plurality of hoses arranged in parallel and floating on the water surface and connecting adjacent two hose lines by chains, which can eliminate the above mentioned drawback which has been encountered with the prior art technique. That is, this invention can prevent adjacent two hose lines from not only separating from each other but also approaching with each other and hence prevent collision thereof.

A feature of the invention is the provision in a binding device for a plurality of hoses arranged in parallel and floating on the water surface and connecting adjacent two hose lines by chains, the improvement comprising a resilient cylindrical cushioning body having a center bore surrounding said chain and including a buoyant member and reinforcing element embedded therein, said chain being extended through said center bore of said cylindrical cushioning body and assembled therewith.

Further objects and features of the invention will be fully understood from the following detailed description with reference to the accompanying drawings, in which:

BRIEF DESCRIPTION OF THE DRAWINGS

FIG. 2 is a front elevational view of an ear plate and chain constituting a binding device according to the invention, a part being broken away;

FIG. 3 is a front elevational view of a resilient cylindrical cushioning constituting a binding device according to the invention, partly shown in section in an enlarged scale.

DETAILED DESCRIPTION OF THE PREFERRED EMBODIMENT

Figure 1:
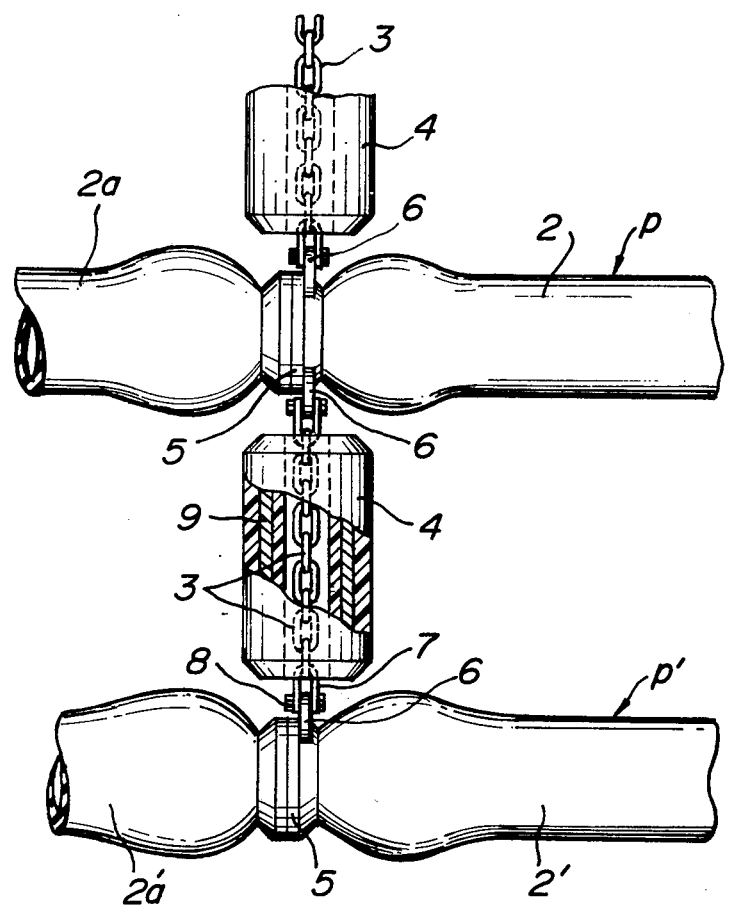
FIG. 1 is a plan view of adjacent two hose lines connected by one embodiment of a binding device according to the invention.

FIG. 1 shows a binding device 1 according to the invention for connecting adjacent two hose lines p, p' each composed of a hose 2, 2a, 2', 2'a floating on the sea surface. The binding device 1 is composed of a chain 3 for preventing the adjacent two hose lines p, p' from separating from each other as shown in FIG. 2 and a resilient cylindrical cushioning body 4 including a buoyant member 9 embedded therein.

Each end of the chain 3 is connected through a shackle 7 to an ear plate 6 secured to and projected from a connection flange 5, 5 of the hose 2, 2' floating on the sea. As a result, the binding device 1 is capable of connecting adjacent two hose lines p, p' without separating them from each other. It is a matter of course that the chain 3 may be detachably secured to the ear plate 6 by means of a bolt 8 extending through U-shaped arms of the shackle 7.

Figure 4:
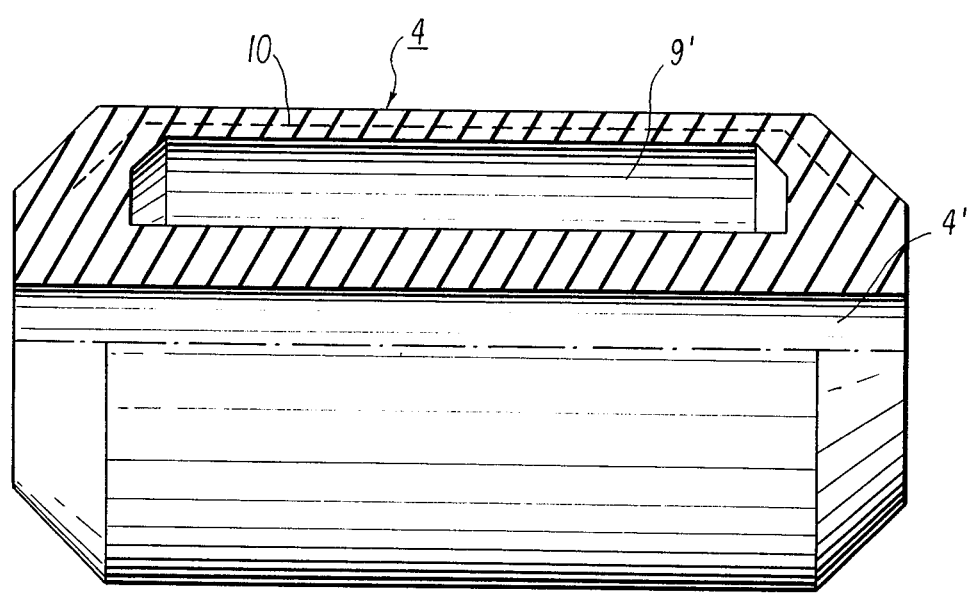
FIG. 4 is a front elevational view of a resilient cylindrical cushioning of a second embodiment of this invention.

The resilient cylindrical cushioning body 4 is provided with a center bore 4' through which is loosely extended the chain 3. The cushioning body 4 is formed of a resilient material such as rubber or the like material having an elastic property and embedded therein with a cylindrical buoyant member 9 such as a sponge rubber or the like as shown in FIG. 4, the buoyant member 9 may be omitted and a space thus obtained may remain as a cavity 9'. The cushioning body 4 may also be provided therein with a reinforcing element 10 such as a fiber cord or the like. The reinforcing element 10 is located outside the buoyant member 9 and functions to protect the cushioning body 4 and buoyant member 9 from being subjected to a compressive force exerted in the lengthwise direction of the cushioning body 4 when the adjacent two hose lines p, p' approach with each other. That is, the buoyant member 9 and reinforcing element 10 are covered with rubber and vulcanized into one integral body to provide the resilient cylindrical cushioning body 4.

As stated hereinbefore, the binding device according to the invention makes use not only of a chain for preventing adjacent two hose lines from separating from each other but also of a resilient cylindrical cushioning body including a buoyant member embedded therein, the cushioning body extended in the lengthwise direction of the chain. As a result, even when the adjacent two hose lines tend to approach with each other by the influence of the waves or the like, the resilient cylindrical cushioning body interposed between the adjacent two hose lines functions to prevent these hose lines from approaching with each other. As a result, it is possible to effectively prevent the hoses floating on the sea from being damaged due to collision. In addition, since the resilient cylindrical cushioning body is mainly composed of rubber or the like material having an elastic property, there is no risk of the hose per se floating on the sea being damaged by the cushioning body. Moreover, the use of the buoyant member embedded in the cushioning body provides the important advantage that the buoyant member functions to float not only the cylindrical cushioning body but also the chain for connecting the adjacent two hose lines on the water to hold them horizontally on the water surface, thereby reducing the load subjected to the chain under the normal state and hence significantly improving resistance to wear of the chain.

What is claimed is:

1. In a binding device for hoses floating on water surface, particularly, for a plurality of hoses arranged in parallel and floating on the water surface, the improvement comprising a chain connecting adjacent two hose lines and a resilient cylindrical cushioning body having a center bore surrounding said chain and including buoyant means and a reinforcing element embedded therein, said chain extending through said center bore of said cylindrical cushioning body and assembled therewith.

2. The binding device according to claim 1, wherein said center bore of said resilient cylindrical cushioning body is loosely engaged with said chain and said chain is provided at its each end with a shackle which is detachably secured to an ear plate secured to a connection flange of said hose line.

3. The binding device according to claim 1, wherein said cushioning body is formed of a resilient material such as rubber or the like material having an elastic property and embedded therein with a cylindrical buoyant member defining said buoyant means and formed of a sponge rubber or the like and said reinforcing element comprises a fiber cord or the like, said reinforcing element being located outside said buoyant member.

4. The binding device according to claim 1, wherein said buoyant means comprises a space formed in said resilient cylindrical cushioning body.

5. The binding device according to claims 1 or 3, wherein said buoyant means and reinforcing element are covered with rubber and vulcanized into one integral body to provide said resilient cylindrical cushioning body.

6. The binding device of claims 1 or 3 wherein said buoyant means and said reinforcing element extend in the direction of said chain.

* * * * *